US009677771B2

(12) United States Patent
Armstrong et al.

(10) Patent No.: US 9,677,771 B2
(45) Date of Patent: Jun. 13, 2017

(54) DOOR LOCK LOGIC

(71) Applicant: General Electric Company, Schenectady, NY (US)

(72) Inventors: James Lee Armstrong, Louisville, KY (US); Joshua Stephen Wiseman, Elizabethtown, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 351 days.

(21) Appl. No.: 14/468,365

(22) Filed: Aug. 26, 2014

(65) Prior Publication Data
US 2016/0061457 A1 Mar. 3, 2016

(51) Int. Cl.
*F24C 15/02* (2006.01)
*F24C 7/08* (2006.01)
(52) U.S. Cl.
CPC ............ *F24C 15/022* (2013.01); *F24C 7/085* (2013.01)

(58) Field of Classification Search
CPC ......................................................... F24C 15/02
USPC .................................................. 126/197, 194
See application file for complete search history.

(56) References Cited

U.S. PATENT DOCUMENTS

| 4,188,867 | A | * | 2/1980 | DeRemer | ............ | A47J 37/0623 |
| | | | | | | 99/385 |
| 4,345,144 | A | * | 8/1982 | Bergquist | ............... | F24C 15/022 |
| | | | | | | 126/197 |
| 6,079,756 | A | * | 6/2000 | Phillips | ............... | E05B 47/0002 |
| | | | | | | 292/198 |
| 6,730,882 | B2 | | 5/2004 | Atkinson | | |
| 2013/0099715 | A1 | | 4/2013 | Fuhge | | |

* cited by examiner

*Primary Examiner* — Avinash Savani
(74) *Attorney, Agent, or Firm* — Dority & Manning, P.A.

(57) ABSTRACT

The present invention provides an oven appliance and for operation of an oven appliance. The oven appliance and a method for operating the oven appliance include features such that the door of the oven appliance remains locked unless a cooking cycle is initiated or a door unlocking element is utilized.

15 Claims, 4 Drawing Sheets

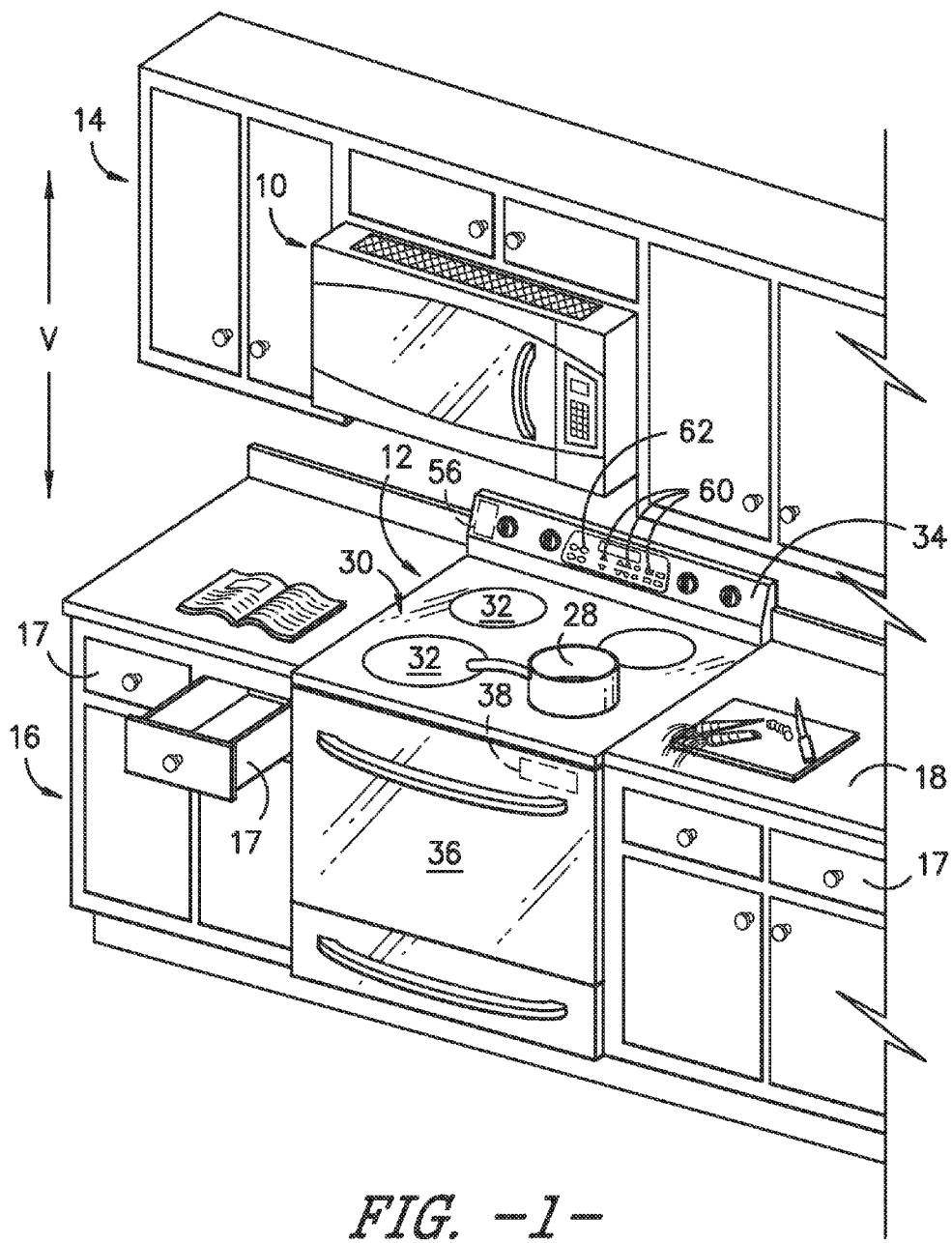
FIG. -1-

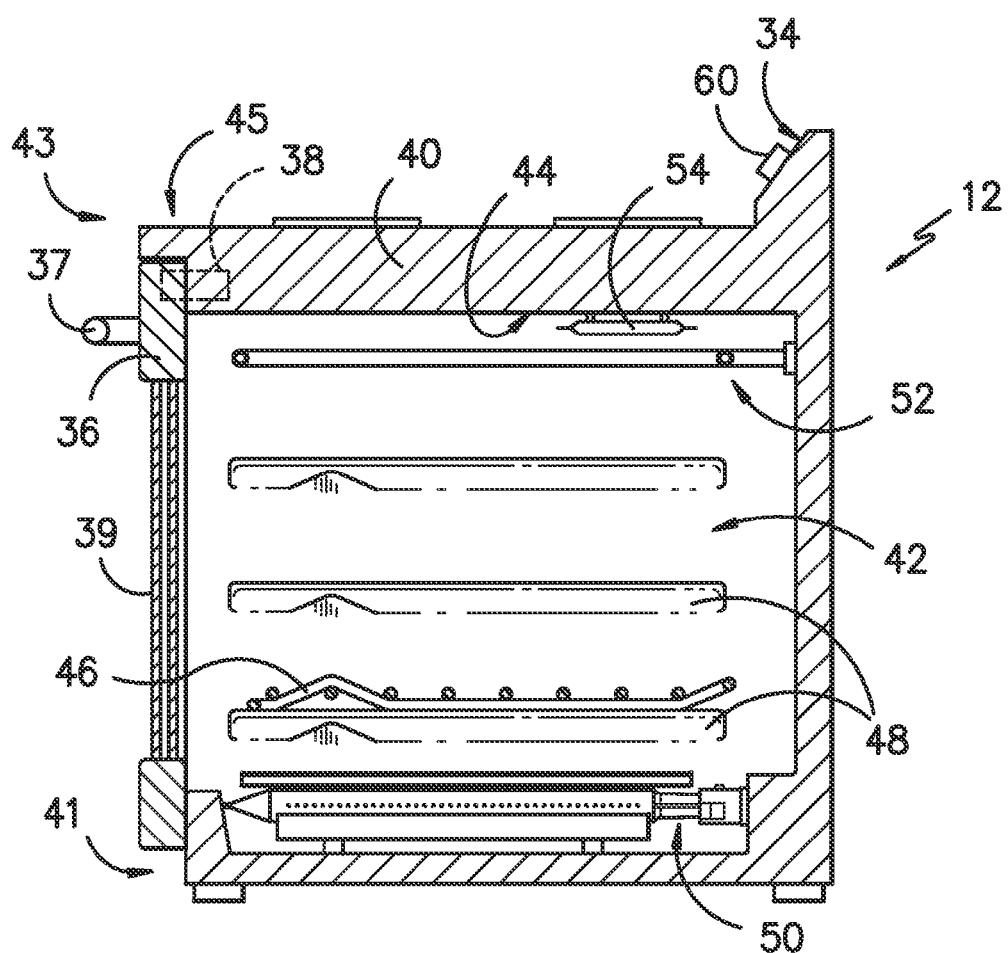
FIG. -2-

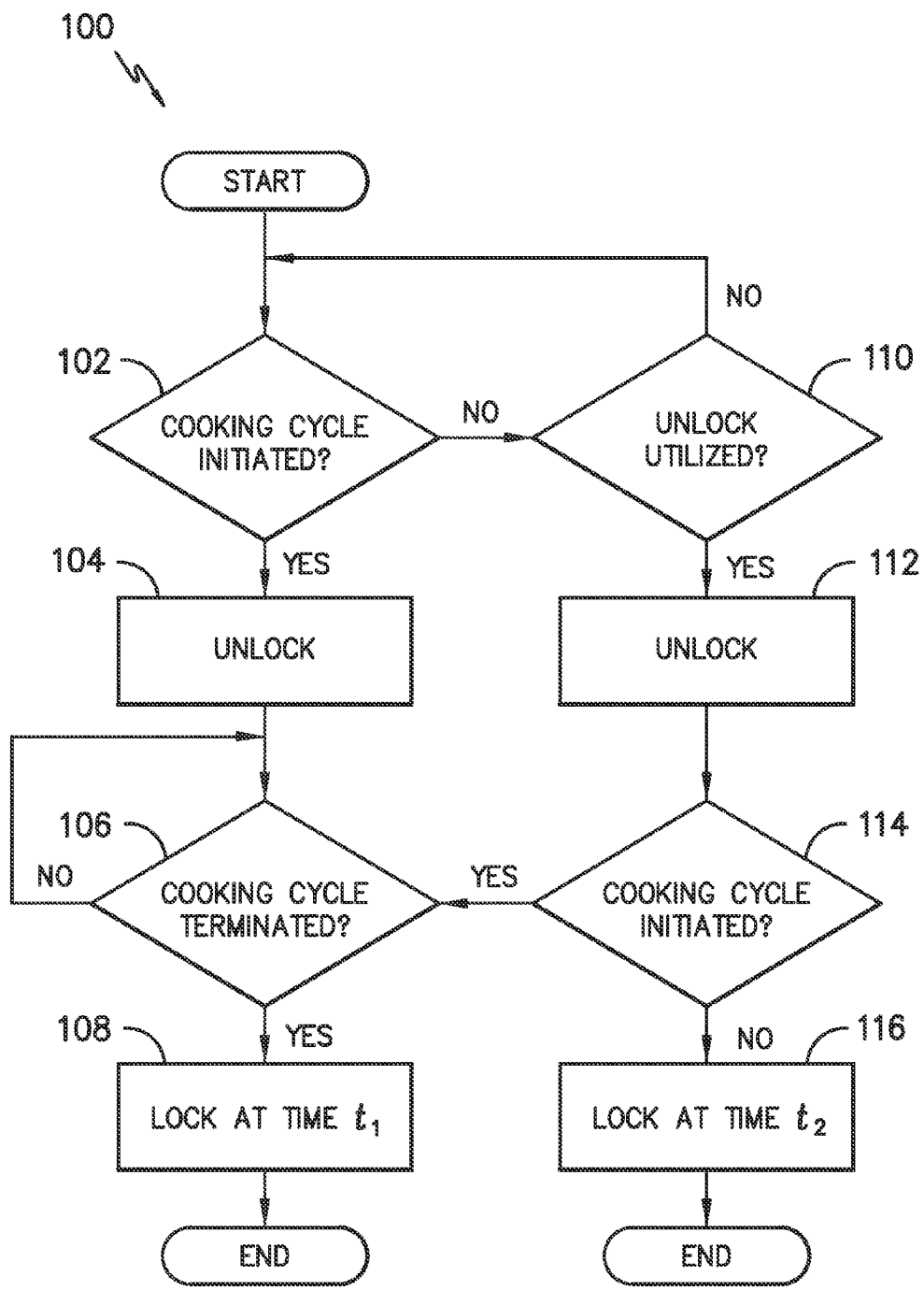
FIG. -3-

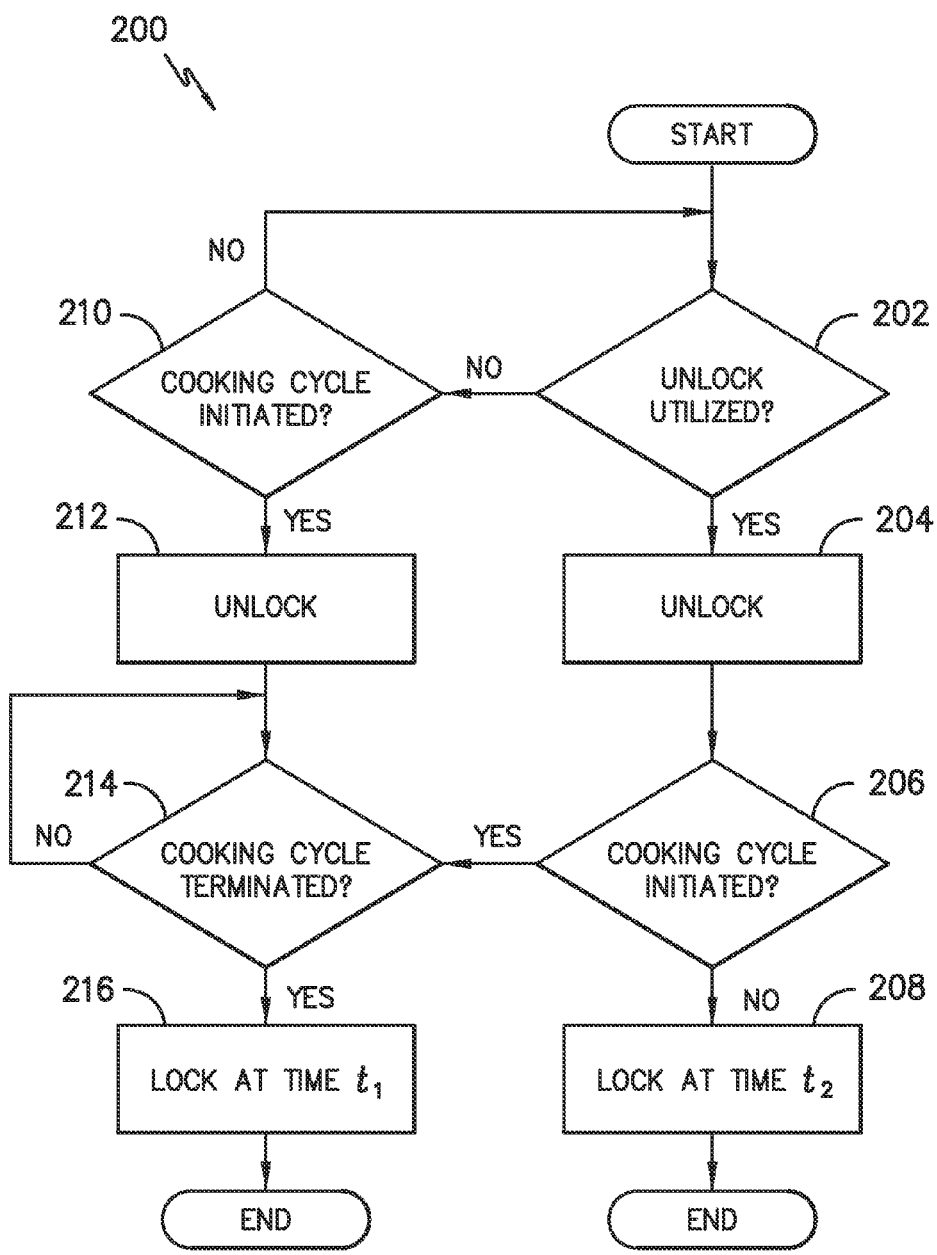
FIG. -4-

DOOR LOCK LOGIC

FIELD OF THE INVENTION

The subject matter of the present disclosure relates generally to methods and systems for locking and unlocking appliance doors, in particular the door of an oven appliance.

BACKGROUND OF THE INVENTION

Oven appliances generally include a cabinet that defines a cooking chamber for baking or broiling food items therein. Oven appliances also usually include a door that, with normal operation, pivots about one or more hinges between an open and a closed position to allow access to the cooking chamber of the cabinet. When in the open position, the door may be parallel to the floor and at a vertical distance above the floor such that, e.g., to a child, the door may appear to provide a step for reaching items on or near the oven appliance that may be out of reach from the floor. The door may otherwise be used abnormally, e.g., to climb on or into the oven appliance. Therefore, to prevent abnormal use of the door, it may be desirable to lock the door in the closed position when the cooking chamber is not being used for baking or broiling food items.

Further, oven range appliances, which, in addition to a cooking chamber for baking and broiling, include a cooktop positioned at a top portion of the cabinet for grilling, broiling, or frying food items thereon, typically are installed against a wall. To prevent the range from accidentally tipping over, such appliances usually include an anti-tip bracket that may be attached to, e.g., the wall. However, some consumers or installers may neglect to attach the anti-tip bracket or may incorrectly attach the anti-tip bracket. If the anti-tip bracket is not properly installed, the oven range may tip over, e.g., if a child climbs on the oven door. Thus, it also may be desirable to lock the door in the closed position when the cooking chamber is not being used for baking or broiling food items to prevent the oven range appliance from tipping over.

Accordingly, an oven appliance with features for keeping the oven door locked when the oven appliance is not being used for cooking and with features for selectively unlocking the oven door would be beneficial. A method for keeping the door of an oven appliance locked when the oven appliance is not being used for cooking unless a user selects to unlock the oven door also would be useful.

BRIEF DESCRIPTION OF THE INVENTION

The present invention provides an oven appliance and for operation of an oven appliance. The oven appliance and a method for operating the oven appliance include features such that the door of the oven appliance remains locked unless a cooking cycle is initiated or a door unlocking element is utilized. Additional aspects and advantages of the invention will be set forth in part in the following description, may be apparent from the description, or may be learned through practice of the invention.

In a first exemplary embodiment, an oven appliance is provided. The oven appliance includes a cabinet defining an opening at a front portion of the cabinet, the cabinet also defining a cooking chamber configured for receipt of food items for cooking; a door mounted to the cabinet at the opening of the cabinet, the door being selectively adjustable between an open position and a closed position to permit selective access to the cooking chamber through the opening of the cabinet; a door lock; a door unlocking element; a heating element configured to heat the cooking chamber; and a controller in operative communication with the door lock and the door unlocking element. The controller is configured for determining whether a cooking cycle of the oven appliance has been initiated and, if so, then activating the door lock to unlock the door; determining whether the cooking cycle has been terminated and, if so, then activating the door lock to lock the door at a predetermined time $t_1$ after the cooking cycle has been terminated.

In a second exemplary embodiment, an oven appliance is provided. The oven appliance includes a cabinet defining an opening at a front portion of the cabinet, the cabinet also defining a cooking chamber configured for receipt of food items for cooking; a door mounted to the cabinet at the opening of the cabinet, the door being selectively adjustable between an open position and a closed position to permit selective access to the cooking chamber through the opening of the cabinet; a door lock; a door unlocking element; a heating element configured to heat the cooking chamber; and a controller in operative communication with the door lock and the door unlocking element. The controller is configured for determining whether the door unlocking element has been utilized and, if so, then activating the door lock to unlock the door; and activating the door lock to lock the door at a predetermined time $t_2$ after the door has been unlocked.

In a third exemplary embodiment, a method for operating an oven appliance is provided. The oven appliance has a door, a door lock, and a door unlocking element. The method includes the steps of determining whether a cooking cycle of the oven appliance has been initiated and, if so, then activating the door lock to unlock the door; determining whether the cooking cycle has been terminated and, if so, then activating the door lock to lock the door at a predetermined time $t_1$ after the cooking cycle has been terminated.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an oven range appliance received within a set of kitchen cabinets according to an exemplary embodiment of the present subject matter.

FIG. 2 provides a cross-section view of the oven range appliance of FIG. 1.

FIG. 3 provides a chart illustrating an exemplary method for operating an oven appliance according to the present subject matter.

FIG. 4 provides a chart illustrating another exemplary method for operating an oven appliance according to the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of an oven range appliance 12 received within a set of kitchen cabinets. Oven range appliance 12 is provided by way of example only and is not intended to limit the present subject matter in any aspect. Thus, the present subject matter may be used with other oven appliance configurations, e.g., that define one or more interior cavities for the receipt of food and/or that are wall mounted. Further, the present subject matter may be used in any other suitable appliance.

FIG. 1 also illustrates a microwave appliance 10, commonly referred to as an over-the-range microwave, mounted to an upper set of kitchen cabinets 14 above an oven range appliance 12, e.g., along a vertical direction V. Upper set of kitchen cabinets 14 is positioned above a base set of kitchen cabinets 16, e.g., along the vertical direction V. Base set of kitchen cabinets 16 includes countertops 18 and drawers 17. Oven range appliance 12 is received within base set of kitchen cabinets 16 below microwave appliance 10 such that a cooking surface 30 of oven range appliance 12 is positioned, e.g., directly below microwave appliance 10 along the vertical direction V. Microwave appliance 10 can include features such as an air handler or fan (not shown) that can draw cooking vapors and/or smoke away from cooking surface 30 and out of the kitchen containing microwave and oven range appliances 10 and 12.

Cooking surface 30 of range 12 includes heated portions 32 that may be heated by heating elements (not shown), e.g., electrical resistive heating elements, gas burners, induction heating elements, and/or any other suitable heating element or combination of heating elements. Cooking utensils, such as cooking utensil 28, may be placed on heated portions 32 to cook or heat food items. Oven range appliance 12 also includes a door 36 that permits access to a cooking chamber 42 (FIG. 2) of oven range appliance 12, e.g., for cooking or baking of food items therein. A control panel 34 of oven range appliance 12 can permit a user to make selections for cooking of food items, e.g., a duration of a cooking cycle of oven range appliance 12 and/or a power setting for the cooking cycle of oven range appliance 12.

FIG. 2 provides a cross-section view of oven range appliance 12. As illustrated, oven range appliance 12 includes an insulated cabinet 40 with an interior cooking chamber 42 defined by an interior surface 44 of cabinet 40. Cooking chamber 42 is configured for the receipt of one or more food items to be cooked. Range appliance 12 includes a door 36 pivotally mounted to cabinet 40, e.g., with one or more hinges (not shown). A handle 37 is mounted to door 36 and assists a user with opening and closing door 36 to access cooking chamber 42. For example, a user can pull on handle 37 to open or close door 36 and access cooking chamber 42.

Oven range appliance 12 includes a door lock 38 that, when engaged, prevents door 36 from opening. Door lock 38 may be an electromechanical lock, or other suitable locking device, positioned on cabinet 40 adjacent the front portion of cabinet 40 that includes a hook that engages door 36. Alternatively, door lock 38 may be positioned on door 36 near the front portion of cabinet 40 and include a hook that engages cabinet 40. The operation of door lock 38 is further described below, and in other embodiments, door lock 38 may be any appropriate mechanism for locking door 36 as described.

Further, oven range appliance 12 can include a seal (not shown) between door 36 and cabinet 40 that assists with maintaining heat and cooking fumes within cooking chamber 42 when door 36 is closed as shown in FIG. 2. Multiple parallel glass panes 39 provide for viewing the contents of cooking chamber 42 when door 36 is closed and assist with insulating cooking chamber 42. A baking rack 46 is positioned in cooking chamber 42 for the receipt of food items or utensils containing food items. Baking rack 46 is slidably received onto embossed ribs or sliding rails 48 such that rack 46 may be conveniently moved into and out of cooking chamber 42 when door 36 is open.

A gas fueled or electric bottom heating element 50 (e.g., a gas burner or a bake gas burner) is positioned in cabinet 40, e.g., at a bottom portion 41 of cabinet 40. Bottom heating element 50 is used to heat cooking chamber 42 for both cooking and cleaning of oven appliance 12. The size and heat output of bottom heating element 50 can be selected based on the e.g., the size of oven appliance 12.

A top heating element 52 is also positioned in cooking chamber 42 of cabinet 40, e.g., at a top portion 43 of cabinet 40. Top heating element 52 is used to heat cooking chamber 42 for both cooking/broiling and cleaning of oven appliance 12. Like bottom heating element 50, the size and heat output of top heating element 52 can be selected based on the e.g., the size of oven appliance 12. In the exemplary embodiment shown in FIG. 2, top heating element 52 is shown as an electric resistance heating element. However, in alternative embodiments, a gas, microwave, halogen, or any other suitable heating element may be used instead of electric resistance heating element 52.

The operation of oven appliance 12, including heating elements 50 and 52, is controlled by a processing device such as a controller 56 (FIG. 1), which may include a microprocessor or other device that is in communication with such components. Such controller 56 may also be communication with a temperature sensor 54 that is used to measure temperature inside cooking chamber 42 and provide such measurements to the controller 56. Temperature sensor 54 is shown in the top and rear of cooking chamber 42. However, other locations may be used and, if desired, multiple temperature sensors may be applied as well.

Controller 56 is operatively coupled or in communication with various other components of microwave appliance 10, including controls 60 and door lock 38. In response to user manipulation of controls 60, controller 56 operates the various components of oven range appliance 12 to execute selected cycles and features.

Controller 56 may include a memory and microprocessor, such as a general or special purpose microprocessor operable to execute programming instructions or micro-control code associated with a cleaning cycle. The memory may represent random access memory such as DRAM, and/or read only memory such as ROM or FLASH. In one embodiment, the processor executes programming instructions stored in memory. The memory may be a separate component from the processor or may be included onboard within the processor. Alternatively, controller 56 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Controls 60 and other components of oven range appliance 12 may be in communication with controller 56 via one or more signal lines or shared communication busses.

Controller 56 may also be in communication with door lock 38 to lock and unlock door 36. In an exemplary embodiment of oven range appliance 12, controller 56 activates door lock 38 to lock door 36 such that door 36 remains locked unless controller 56 receives input that door 36 should be unlocked. For example, a user may initiate a cooking cycle, e.g., by selecting a bake or broil mode of operation or setting a baking or broiling temperature, which may signal to controller 56 to unlock door 36. Additionally, oven range appliance 12 may include one or more controls 60 that, when utilized separately or in combination, may signal to controller 56 to unlock door 36. For example, control panel 34 may include a door unlocking element 62, such as, e.g., a button, knob, or the like, that a user may utilize to indicate door 36 should be unlocked. Alternatively, door unlocking element 62 may consist of several controls 60 that, when utilized in a programmed sequence, indicate to controller 56 to unlock door 36. Other configurations of door unlocking element 62 may be used as well.

Thus, door lock 38 defaults to an engaged position such that door 36 is locked; therefore, door 36 cannot be opened until a user indicates that door 36 should be unlocked. By restricting use of door 36 in this way, abnormal use of door 36 can be prevented. For example, a child may consider door 36 of oven range appliance 12 useful as a step to reach the cooktop and/or items thereon or the surfaces in the vicinity of oven range appliance 12. In addition to providing access to potentially harmful items, abnormal use of door 36 could cause oven range appliance 12 to tip over. Accordingly, if door 36 of oven appliance 12 generally remains locked, abnormal use of door 36, as well as other potentially harmful uses of oven appliance 12, can be avoided.

Referring now to FIG. 3, an exemplary method for operating oven range appliance 12 is illustrated. When method 100 begins, door lock 38 is in the locked position, as previously described. At step 102, controller 56, or any other suitable device, determines whether a cooking cycle has been initiated. If so, door lock 38 is activated at step 104 to unlock door 36. At step 106, controller 56 determines whether the cooking cycle has been terminated, and if not, controller 56 continues to monitor whether the cooking cycle has been terminated. If the cooking cycle has been terminated, at step 108, door lock 38 is activated at a predetermined time $t_1$ after the cooking cycle has been terminated.

However, if at step 102 a cooking cycle has not been initiated, controller 56 may determine at step 110 whether door unlocking element 62 has been utilized to signal that door 36 should be unlocked. As described, door unlocking element 62 may be, e.g., a button or knob that, when depressed or rotated, indicates to controller 56 that door 36 should be unlocked. In alternative embodiments, door unlocking element 62 may be one or more controls 60 that may be utilized simultaneously or in a preprogrammed sequence to indicate to controller 56 that the user desires door 36 to be unlocked. If door unlocking element 62 has not been utilized, door lock 38 remains engaged and door 36 remains locked.

If at step 110 controller 56 determines that door unlocking element 62 has been utilized, at step 112 door lock 38 is activated to unlock door 36. Thereafter, as shown at step 114, controller 56 may determine whether a cooking cycle has been initiated. If so, as described at steps 106 and 108, controller 56 determines when the cooking cycle is terminated, and door lock 38 is activated to lock door 36 at a predetermined time $t_1$ after the cooking cycle is terminated. If a cooking cycle is not initiated after door lock 38 is activated at step 112 to unlock door 36, door lock 38 is activated at step 116 to lock door 36 at a predetermined time $t_2$ after door 36 is unlocked.

As shown in FIG. 4, in alternative embodiments, controller 56 could determine whether door 36 should be unlocked by first determining whether door unlocking element 62 has been utilized, and if not, then determining whether a cooking cycle has been initiated. Thus, method 200 includes step 202 of determining whether door unlocking element 62 has been utilized to signal that door 36 should be unlocked. If at step 202 controller 56 determines that door unlocking element 62 has been utilized, at step 204 door lock 38 is activated to unlock door 36. Thereafter, as shown at step 206, controller 56 may determine whether a cooking cycle has been initiated. If so, as shown at steps 214 and 216 further described below, controller 56 determines when the cooking cycle is terminated, and door lock 38 is activated to lock door 36 at a predetermined time $t_1$ after the cooking cycle is terminated. If a cooking cycle is not initiated after door lock 38 is activated at step 204 to unlock door 36, door lock 38 is activated at step 208 to lock door 36 at a predetermined time $t_2$ after door 36 is unlocked.

However, if at step 202 controller 56 determines door unlocking element 62 has not been utilized, method 200 proceeds to step 210. At step 210, controller 56 determines whether a cooking cycle has been initiated. If so, door lock 38 is activated at step 212 to unlock door 36. At step 214, controller 56 determines whether the cooking cycle has been terminated, and if not, controller 56 continues to monitor whether the cooking cycle has been terminated. If the cooking cycle has been terminated, at step 216, door lock 38 is activated at a predetermined time $t_1$ after the cooking cycle has been terminated. Otherwise, if at step 210 a cooking cycle has not been initiated, door lock 38 remains engaged and door 36 remains locked.

Predetermined times $t_1$ and $t_2$ may be any suitable times to allow a user access to cooking chamber 42 while also preventing abnormal use of door 36. As described, time $t_1$ may be measured from when controller 56 determines the cooking cycle has been terminated, and time $t_2$ may be measured from when door 36 is unlocked in response to utilization of door unlocking element 62. Time $t_1$ may be longer or shorter than time $t_2$, or time $t_1$ may be equal to time $t_2$. Additionally, times $t_1$ and $t_2$ may be programmed into controller 56 during manufacture of oven range appliance 12 or may be selected by a user of oven range appliance 12 upon installation of the oven. Other ways of measuring times $t_1$ and $t_2$ may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An oven appliance, comprising:
   a cabinet defining an opening at a front portion of the cabinet, the cabinet also defining a cooking chamber configured for receipt of food items for cooking;
   a door mounted to the cabinet at the opening of the cabinet, the door being selectively adjustable between an open position and a closed position to permit selective access to the cooking chamber through the opening of the cabinet;
   a door lock;
   a door unlocking element;
   a heating element configured to heat the cooking chamber; and
   a controller in operative communication with the door lock and the door unlocking element, the controller configured for
      determining whether a cooking cycle of the oven appliance has been initiated and, if so, then
         activating the door lock to unlock the door; and
      determining whether the cooking cycle has been terminated and, if so, then
         activating the door lock to lock the door at a predetermined time $t_1$ after the cooking cycle has been terminated,
   wherein the door lock is an electromechanical lock.

2. The oven appliance of claim 1, wherein the controller is further configured for
   determining, if a cooking cycle has not been initiated, whether the door unlocking element has been utilized and, if so, then
      activating the door lock to unlock the door;
   determining whether a cooking cycle has been initiated and, if so, then
      determining whether the cooking cycle has been terminated and, if so, then
         activating the door lock to lock the door at a predetermined time $t_1$ after the cooking cycle has been terminated.

3. The oven appliance of claim 2, wherein the controller s further configured for
   activating the door lock to lock the door at a predetermined time $t_2$ after the door has been unlocked if a cooking cycle is not initiated while the door is unlocked.

4. The oven appliance of claim 1, wherein the door lock is positioned at the front portion of the cabinet and engages the door.

5. The oven appliance of claim 1, wherein the door lock is positioned on the door and engages the cabinet of the oven appliance at the front portion of the cabinet.

6. The oven appliance of claim 1, wherein the door unlocking element comprises a button positioned on an user interface of the oven appliance.

7. An oven appliance, comprising:
   a cabinet defining an opening at a front portion of the cabinet, the cabinet also defining a cooking chamber configured for receipt of food items for cooking;
   a door mounted to the cabinet at the opening of the cabinet, the door being selectively adjustable between an open position and a dosed position to permit selective access to the cooking chamber through the opening of the cabinet;
   a door lock;
   a door unlocking element;
   a heating element configured to heat the cooking chamber; and
   a controller in operative communication with the door lock and the door unlocking element, the controller configured for
      determining whether the door unlocking element has been utilized and, if so, then activating the door lock to unlock the door;
         determining whether a cooking cycle of the oven appliance has been initiated and, if so, then
            determining whether the cooking cycle has been terminated and, if so, then
               activating the door lock to lock the door of at a predetermined time $t_1$ after the cooking cycle has been terminated; and
      activating the door lock to lock the door at a predetermined time $t_2$ after the door has been unlocked if a cooking cycle is not initiated while the door is unlocked.

8. The oven appliance of claim 7, wherein the controller is further configured for
   determining, if the door unlocking element has not been utilized, whether a cooking cycle of the oven appliance has been initiated and, if so, then
      activating the door lock to unlock the door;
   determining whether the cooking cycle has been terminated and, if so, then
      activating the door lock to lock the door at a predetermined time $t_1$ after the cooking cycle has been terminated.

9. The oven appliance of claim 7, wherein the door lock is an electromechanical lock.

10. The oven appliance of claim 7, wherein the door lock is positioned at the front portion of the cabinet and engages the door.

11. The oven appliance of claim 7, wherein the door lock is positioned on the door and engages the cabinet of the oven appliance at the front portion of the cabinet.

12. The oven appliance of claim 7, wherein the door unlocking element comprises a button positioned on an user interface of the oven appliance.

13. A method for operating an oven appliance, the oven appliance having a door, a door lock, and a door unlocking element, the method comprising:
   determining whether a cooking cycle of the oven appliance has been initiated and, if so, then activating the door lock to unlock the door; and
   determining whether the cooking cycle has been terminated and, if so, then
      activating the door lock to lock the door at a predetermined time $t_1$ after the cooking cycle has been terminated,
   wherein the door remains locked if a cooking cycle has not been initiated when determining whether a cooking cycle has been initiated.

14. The method of claim 13, further comprising:
   determining, if a cooking cycle has not been initiated, whether the door unlocking element has been utilized and, if so, then
      activating the door lock to unlock the door;
   determining whether a cooking cycle has been initiated and, if so, then
      determining whether the cooking cycle has been terminated and, if so, then
         activating the door lock to lock the door at a predetermined time $t_1$ after the cooking cycle has been terminated.

15. The method of claim 14, further comprising:
activating the door lock to lock the door at a predetermined time $t_2$ after the door has been unlocked if a cooking cycle is not initiated while the door is unlocked.

\* \* \* \* \*

UNITED STATES PATENT AND TRADEMARK OFFICE
CERTIFICATE OF CORRECTION

| | |
|---|---|
| PATENT NO. | : 9,677,771 B2 |
| APPLICATION NO. | : 14/468365 |
| DATED | : June 13, 2017 |
| INVENTOR(S) | : James Lee Armstrong |

It is certified that error appears in the above-identified patent and that said Letters Patent is hereby corrected as shown below:

In the Claims

In Line 41 of Column 7, "s" should be "is"

In Line 61 of Column 7, "dosed" should be "closed"

Signed and Sealed this
Twenty-second Day of May, 2018

Andrei Iancu
*Director of the United States Patent and Trademark Office*